United States Patent
Pichara et al.

(10) Patent No.: US 10,970,621 B1
(45) Date of Patent: Apr. 6, 2021

(54) METHODS TO PREDICT FOOD COLOR AND RECOMMEND CHANGES TO ACHIEVE A TARGET FOOD COLOR

(71) Applicant: NotCo Delaware, LLC, Santiago (CL)

(72) Inventors: Karim Pichara, Santiago (CL); Pablo Zamora, Santiago (CL); Matías Muchnick, Santiago (CL); Yoni Lerner, Palo Alto, CA (US); Osher Lerner, Palo Alto, CA (US)

(73) Assignee: NOTCO DELEWARE, LLC, Santiago (CL)

( * ) Notice: Subject to any disclaimer, the term of this patent is extended or adjusted under 35 U.S.C. 154(b) by 0 days.

(21) Appl. No.: 16/596,689

(22) Filed: Oct. 8, 2019

(51) Int. Cl.
*G06N 3/04* (2006.01)
*G06N 3/08* (2006.01)

(52) U.S. Cl.
CPC ........... *G06N 3/0454* (2013.01); *G06N 3/084* (2013.01)

(58) Field of Classification Search
CPC .............................. G06N 3/0454; G06N 3/084
See application file for complete search history.

(56) References Cited

U.S. PATENT DOCUMENTS

| 8,775,341 | B1 * | 7/2014 | Commons | G10L 15/16 706/20 |
| 2002/0184167 | A1 * | 12/2002 | McClanahan | G06T 11/001 706/16 |
| 2007/0139667 | A1 * | 6/2007 | Russell | G01J 3/462 358/1.9 |
| 2017/0139902 | A1 | 5/2017 | Byron et al. | |
| 2017/0238590 | A1 | 8/2017 | Bansal-Mutalik et al. | |
| 2017/0345185 | A1 * | 11/2017 | Byron | G06T 7/11 |
| 2018/0101784 | A1 * | 4/2018 | Rolfe | G06K 9/6256 |
| 2018/0203921 | A1 * | 7/2018 | Privault | G06N 20/00 |

OTHER PUBLICATIONS

Rong, Xin. word2vec Parameter Learning Explained. arXiv:1411. 2738v4 [cs.CL] Jun. 5, 2016. (Year: 2016).*
Salvador, Amaia, et al. "Learning cross-modal embeddings for cooking recipes and food images." Proceedings of the IEEE conference on computer vision and pattern recognition. 2017. (Year: 2017).*
International Searching Authority, "Search Report" in application No. PCT/US2020/054089, dated Oct. 30, 2020, 14 pages.

* cited by examiner

*Primary Examiner* — Alexey Shmatov
*Assistant Examiner* — Robert Bejcek, II
(74) *Attorney, Agent, or Firm* — Hickman Becker Bingham Ledesma LLP (57) ABSTRACT

A color predictor is provided to predict the color of a food item given its formula comprising the ingredients and its quantities. The color predictor may utilize machine learning algorithms and a set of recipe data to train the color predictor. The color predictor can also be used by a color recommender to recommend changes in the given formula to achieve a target color.

20 Claims, 8 Drawing Sheets

METHODS TO PREDICT FOOD COLOR AND RECOMMEND CHANGES TO ACHIEVE A TARGET FOOD COLOR

TECHNICAL FIELD

The disclosure generally relates to food science and artificial intelligence, in particular, use of machine learning to predict color of a food item and/or recommend changes to achieve a target color.

DETAILED DESCRIPTION

The following description of the embodiments is not intended to limit the invention to these embodiments, but rather to enable any person skilled in the art to make and use.

In some instances, color of a food item prepared using a set of ingredients may not be as expected, or a chef or another entity may desire to improve or change the color of the food item without starting from scratch. In some other instances, it may be desirable to predict the color of the food item before it's prepared or cooked so that the recipe can be altered or not cooked at all. Certain embodiments can predict the color of a food item given a formula for its recipe by utilizing data science, color science, food science and machine learning algorithms. The formula may include a list of ingredients and their respective quantities. Certain embodiments can also recommend changes in the given formula to achieve a desired color with minimum modifications to the recipe.

The food item can include plant-based ingredients, animal-based ingredients, synthetic ingredients, and/or a combination thereof. In some examples, the food item can be a plant-based food item that can mimic animal-based foods from the sensory (e.g., flavor and/or texture) and/or visual perspectives. A number of products (e.g., plant-based ingredients, etc.) are available in the market that can provide substitutes for animal-based food (e.g., animal-based food such as chicken, meat patties, milk, etc.). For example, a combination of plant-based ingredients can be cooked using a certain recipe to taste, look and/or feel like sausage.

Certain embodiments may approach the color prediction of the food item as a regression problem. A color predictor can use machine learning algorithms to predict the color in a certain color space given a list of strings representing the ingredients of the food item. In some instances, the prediction can be used to determine whether the recipe for the food item needs to be altered or not needed at all even before the food item is cooked or prepared. The color predictor can additionally or alternatively be used as a component in a color recommender to provide a recommendation for changes in the formula for the recipe to improve the color of the food item and/or to achieve a target color. The color recommender may additionally or alternatively implement a loss function to optimize the changes in the given formula by considering attribute distance, ingredient distance, ingredient likelihood, ingredient sparsity, and/or other factors. In a specific example, the color recommender can be based on all of attribute distance, ingredient distance, ingredient likelihood, and ingredient sparsity.

Figure 1:
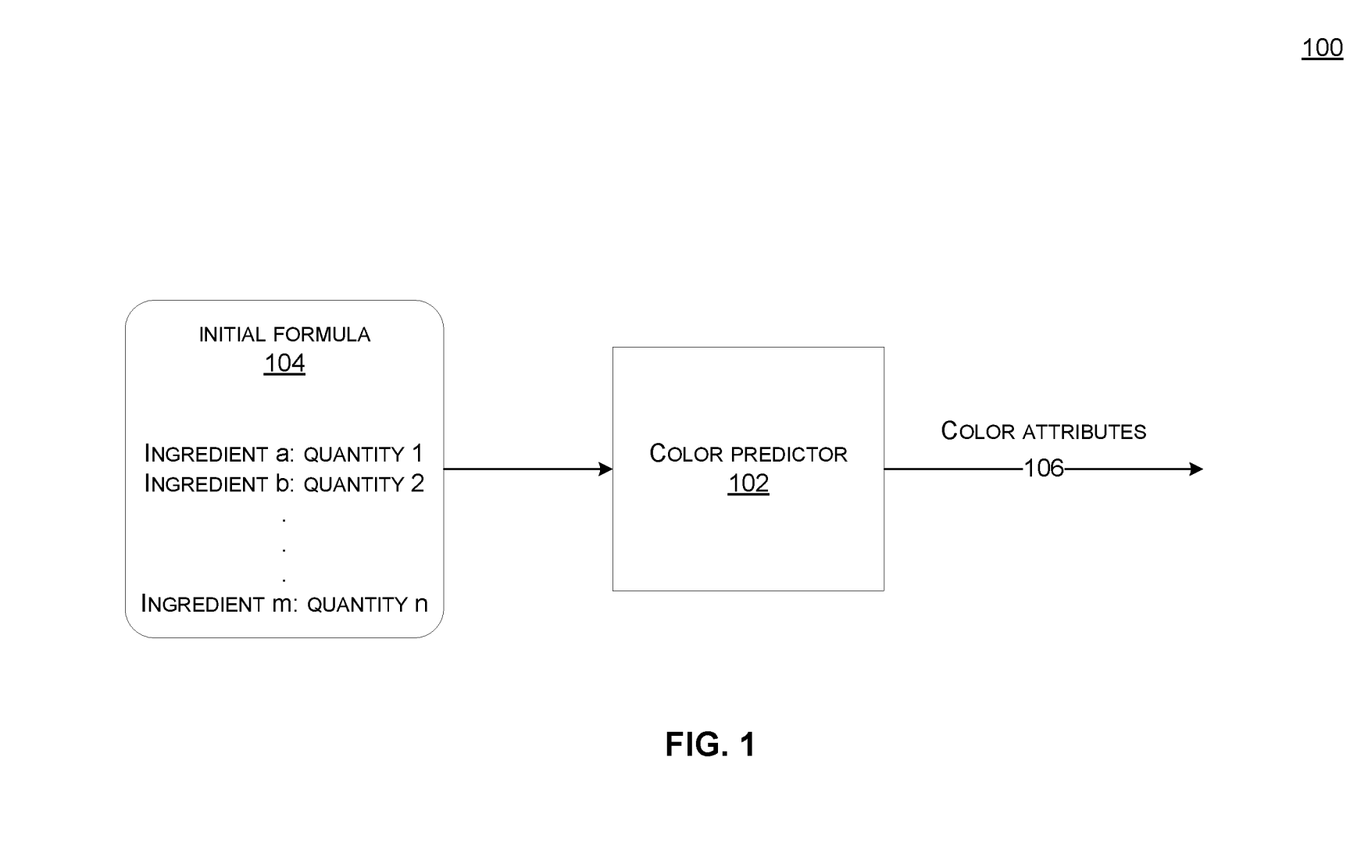
FIG. 1 illustrates a system comprising a color predictor configured to predict the color of a food item given its formula in certain embodiments.

FIG. 1 illustrates a system 100 comprising a color predictor 102 configured to predict the color of a food item given its formula (e.g., based on its formula, etc.). The color predictor 102 may receive an initial formula 104 of a recipe for the food item and provide color attributes 106 of the predicted color. The color attributes 106 may represent the color in a color space with floating-point values. For example, the color predictor 102 may determine that the color of the food item is a particular color (e.g., brown, white, yellow, etc.) based on a color palette or a color scheme.

The initial formula 104 of the recipe for the food item preferably includes two or more ingredients and their respective quantities. Additionally or alternatively, the food item may include any suitable number of ingredients and/or their respective quantities. The recipe may include plant-based ingredients, animal-based ingredients, water-based ingredients, synthetic ingredients, and/or a combination thereof. Some non-limiting examples of the plant-based ingredients may include vegetables (e.g., onions, potatoes, peas, garlic, spinach, carrots, celery, squash, etc.), fruit (e.g., apples, pears, grapes, etc.), herbs (e.g., oregano, cilantro, basil, etc.), spices (black peppers, turmeric, red chili peppers, cinnamon, etc.), oils (e.g., corn oil, olive oil, almond oil), nuts (e.g., almonds, walnuts, pistachios, etc.), legumes (e.g., lentils, dried peas, soybeans, pulses, etc.), starch, proteins, fibers, carbohydrates, sugars, and/or other suitable plant-based ingredients, etc. Some non-limiting examples of the animal-based ingredients may include dairy products (e.g., milk, butter, cheese, yogurt, ice cream, etc.), egg-based products (e.g., mayonnaise, salad dressings, etc.), meat products (e.g., burger patties, sausages, hot dogs, bacon, etc.), seafood (e.g., fish, crab, prawns, etc.), and/or other suitable animal-based ingredients, etc. Synthetic ingredients may include artificially produced food, e.g., artificial meats, artificial sweeteners, artificial milk, and/or other suitable synthetic ingredients, etc.

As shown in FIG. 1, the initial formula 104 may include a quantity 1 (e.g., a first quantity, etc.) for an ingredient a (e.g., a first ingredient, etc.), a quantity 2 (e.g., a second quantity, etc.) for an ingredient b (e.g., a second ingredient, etc.), and a quantity n (e.g., an nth quantity, etc.) for an ingredient m (e.g., an mth ingredient, etc.). The quantities may be represented using percentages, fractions, units, and/or or other suitable value types and/or methods. In one example, the initial formula 104 may include 47.2% water, 20.6% pea protein, and 15.7% coconut oil, hence the ingredient a (e.g., first ingredient, etc.) is "water", ingredient b (e.g., second ingredient, etc.) is "pea protein", ingredient m (e.g., mth ingredient, etc.) is "coconut oil", quantity 1 (e.g., first quantity, etc.) is "47.2", quantity 2 (e.g., second quantity, etc.) is "20.6" and quantity n (e.g., nth quantity, etc.) is "15.7".

The color predictor 102 may be configured to perform the color prediction using a prediction model based on neural networks, regression models, classification models, and/or other suitable machine learning algorithms.

In certain embodiments, color predictor(s) 102 and/or other suitable models, suitable components of embodiments, and/or suitable portions of embodiments of methods described herein can include, apply, employ, perform, use, be based on, and/or otherwise be associated with artificial intelligence approaches (e.g., machine learning approaches, etc.) including any one or more of: supervised learning (e.g., using gradient boosting trees, using logistic regression, using back propagation neural networks, using random forests, decision trees, etc.), unsupervised learning (e.g., using an Apriori algorithm, using K-means clustering), semi-supervised learning, a deep learning algorithm (e.g., neural networks, a restricted Boltzmann machine, a deep belief network method, a convolutional neural network method, a recurrent neural network method, stacked autoencoder method, etc.), reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., Bayesian Linear Regression, Bayesian Neural Networks, Bayesian Logistic Regression, averaged one-dependence estimators, Bayesian belief network, etc.), a kernel method (e.g., a support vector machine, a radial basis function, a linear discriminant analysis, Gaussian processes, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), suitable classifiers (e.g., naïve Bayes, etc.), and/or any suitable artificial intelligence approach.

In an embodiment, the ingredients a-m (and/or any suitable number and/or type of ingredients, etc.) may be represented as a list of strings which can be converted to a multi-dimensional embedding vector to represent the ingredients in a meaningful space. As an example, "word2vec", "Glove", and/or another suitable ingredients embedding model may be used to produce the embedding vector. Additionally, a vectorized version of a loss function (e.g., CIEDE2000) may be implemented that can be interpreted and differentiated by the prediction model. The ingredients embedding model can be trained by utilizing supervised data, unsupervised data and/or a combination thereof. In some instances, the ingredients embedding model may additionally or alternatively be used to predict the probability of each ingredient to be in a recipe. Alternatively, the ingredients can be represented in any suitable form.

The color attributes 106 produced by the color predictor 102 may be represented as a vector belonging to a certain color space. Alternatively, the color attributes 106 can be represented as a non-vector and/or in any suitable representation. In examples, the color space may correspond to CIELAB, RGB (red, green, blue), inverted RBG, HSV (hue, saturation, value), CMYK, and/or another suitable color space. In certain implementations, the color predictor 102 may use the images associated with the food item and identify a most prominent or strongest color in the food item for representing in the color attributes 106 belonging to the specific color space. In certain embodiments, the color predictor 102 is further explained with reference to FIG. 2.

Figure 2:
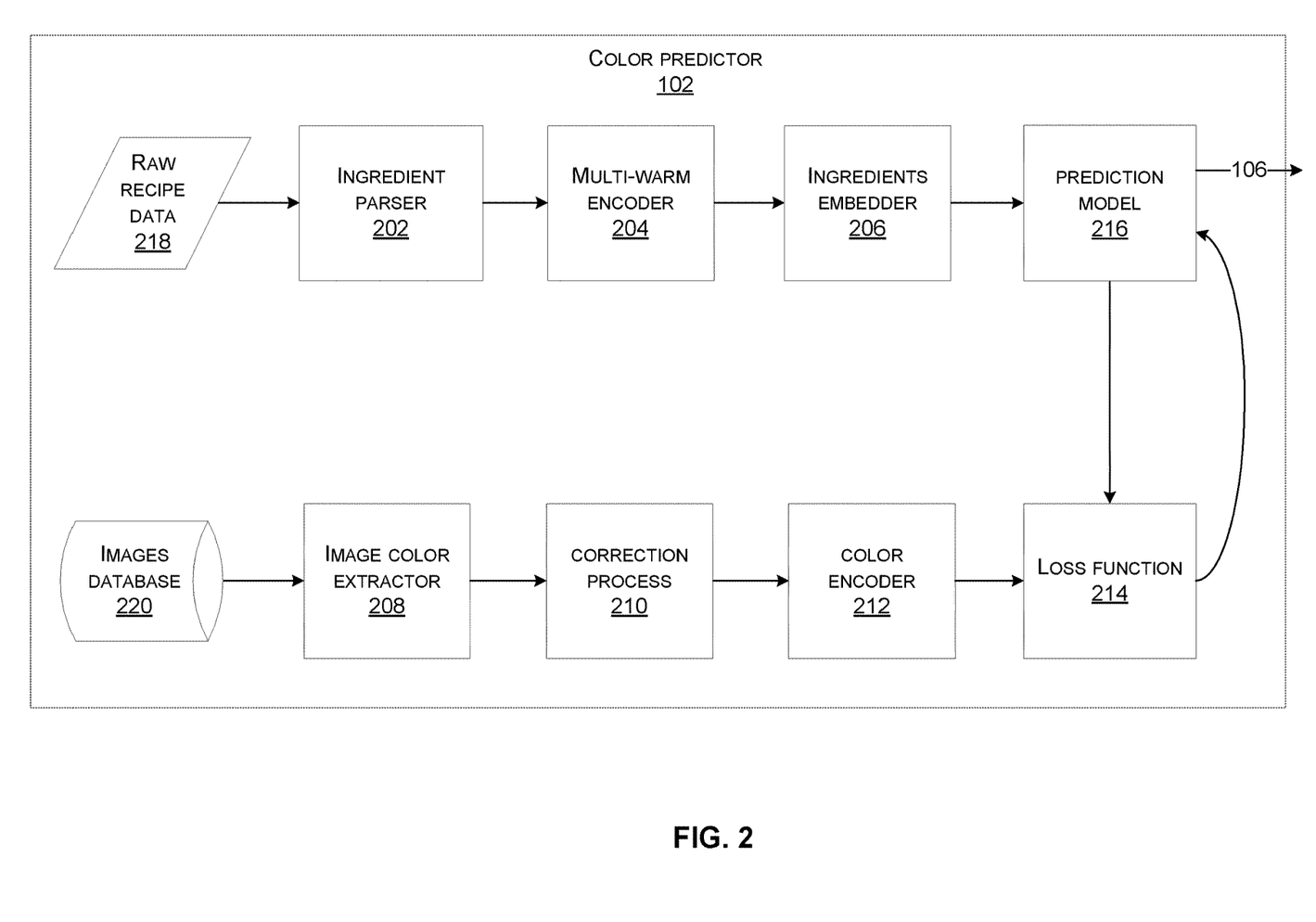
FIG. 2 illustrates a block diagram of the color predictor in certain embodiments.

FIG. 2 illustrates a block diagram of the color predictor 102 in certain embodiments.

The color predictor 102 may include an ingredient parser 202, a multi-warm encoder 204, an ingredients embedder 206, an image color extractor 208, a correction process 210, a color encoder 212, a loss function model 214, and a prediction model 216. Additionally or alternatively, the color predictor 102 can include any suitable combination of the above.

Raw recipe data 218 may be part of a supervised dataset, and/or an unsupervised dataset. The supervised dataset may include input data and output data that may be labeled to be used as a training dataset (e.g., a first training dataset) for future data processing. For example, the supervised dataset may include data for a recipe for a food item as an input and a color attribute of the food item as the output. The unsupervised dataset may include only input data without any corresponding output data. However, any suitable data types can be used for the training dataset.

The raw recipe data 218 may store data associated with multiple recipes of various food items (e.g., one or more recipes of one or more food items; in a 1:1 recipe to food item relationship and/or any suitable numerical relationship between recipes and food items, etc.). In certain examples, the raw recipe data 218 may store ingredients as a list of tuples of the ingredient name (e.g., string) and its proportion (e.g., percentage or quota). As an example, the ingredients may include [{"name": "water", "quota": 47.197640117994105}, {"name": "pea protein (textured)", "quota": 20.64896755162242}, {"name": "coconut oil (without flavor)", "quota": 15.7325467059980934}, . . . ]. The raw recipe data 218 may also store recipe as a list of step strings, e.g., [{"step":1, "description": "Weigh 20.65 g of pea protein (textured), 1.57 g of salt and 0.10 g of beetroot powder in a bowl" }, . . . ]. The raw recipe data 218 may also store observed colors as a list of strings and one or more images of each food item. The raw recipe data 218 may utilize JSON format and/or another suitable format to store the information. The raw recipe data 218 may be stored in memory, e.g., RAM, EEPROM, flash memory, hard disk drives, optical disc drives, solid state memory, and/or any type of memory suitable for data storage.

The ingredient parser 202 may be configured to parse the raw recipe data 218. In certain examples, the ingredient parser 202 may process the ingredient strings in the raw recipe data 218 to remove any duplicate ingredients, remove parentheticals and post-comma descriptors, collapse double spaces, remove quantities using list of quantity words, filter overly-long ingredients and match to clean reference ingredients when possible, and/or any other text processing and/or other suitable processing. As an example, "organic wild berries (organic blackberries, organic strawberries, organic bilberries, organic raspberries)" may be processed to "berries." Similarly, "½ (12 ounce) box vanilla wafer cookies (such as Nilla®), crushed very fine" may be processed to "vanilla wafer cookies." Processing can be automatic, computational, manual, and/or other suitable types of processing.

Figure 3:
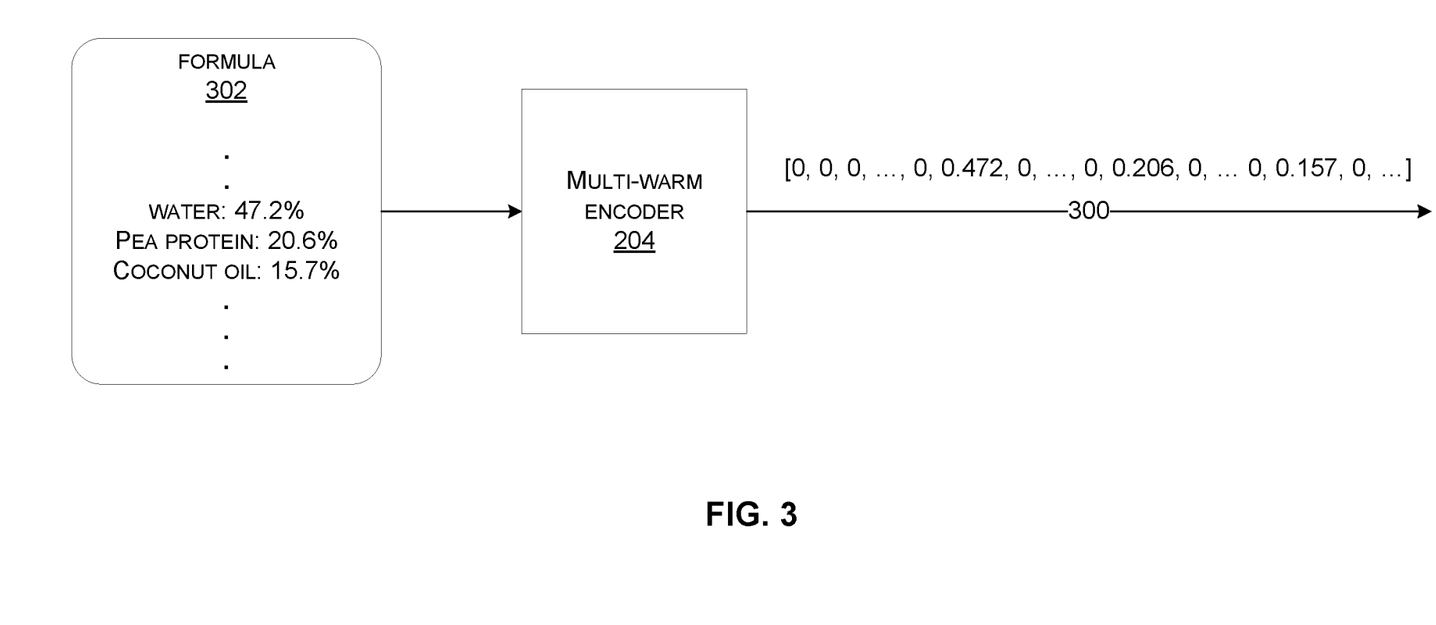
FIG. 3 illustrates an example encoding vector generated using the multi-warm encoder for an example given formula according to certain embodiments.

The multi-warm encoder 204 may be configured to represent the formula as a sparse proportional vector. In specific examples, the multi-warm encoder 204 functions to generate (e.g., output, etc.) one or more multi-warm vectors 300, such as based on one or more formulas 302 and/or other suitable inputs. Each dimension of the sparse proportional vector may correspond to a unique ingredient, and the value in each dimension can be the proportion of that ingredient present in the food item. In a specific example, the proportions are scaled to sum to 1 instead of 100, but any suitable type of scaling can be employed. In a specific example, the multi-warm encoded vector may include entries that are "warm" (e.g., floating point) instead of "hot" (e.g., one) with most dimensions being zeros and few dimensions being non-zero. However, the formula can be represented in any suitable manner.

FIG. 3 shows an example multi-warm vector 300 generated using the multi-warm encoder 204 for a given formula 302. The formula 302 may be similar to the initial formula 104 in FIG. 1. As an example, the formula 302 may include "water: 47.2%", "pea protein: 20.6%", and "coconut oil: 15.7%" among other ingredients. The multi-warm encoder 204 may encode the formula 302 to produce a sparse proportional vector comprising [0, 0, 0, . . . , 0, 0.472, 0, . . . , 0, 0.206, 0, . . . , 0, 0.157, 0, . . . ] as represented by the multi-warm vector 300. The multi-warm encoding may be used to perform a weighted sum of embeddings. Since embeddings are generally trained without quantities, the multi-warm values can be scaled using each ingredient's distribution.

Referring back to FIG. 2, the ingredients embedder 206 may be configured to convert the ingredient strings into multi-dimensional embedding vectors that may contain pertinent information about the ingredients. The ingredient embeddings may be generated by training an embedding layer using a model similar to an autoencoder for unsupervised feature learning. In a specific example, the autoencoder is a type of artificial neural network which can be used for dimensionality reduction by copying the most relevant aspects of its input to its output. Given a set of ingredient strings, for each ingredient, the embedding layer may provide a likelihood of also being in a recipe. In some examples, the ingredients embedder 206 may be used to identify ingredients from an unsupervised dataset that may be similar to a first set of ingredients used in the supervised dataset, e.g., represented by the raw recipe data 218 in FIG. 2. Thus, use of the ingredients embedder 206 may be beneficial to incorporate unsupervised data and domain knowledge to supplement a limited amount of supervised data. In certain embodiments, this is further explained with reference to FIG. 4.

Figure 4:
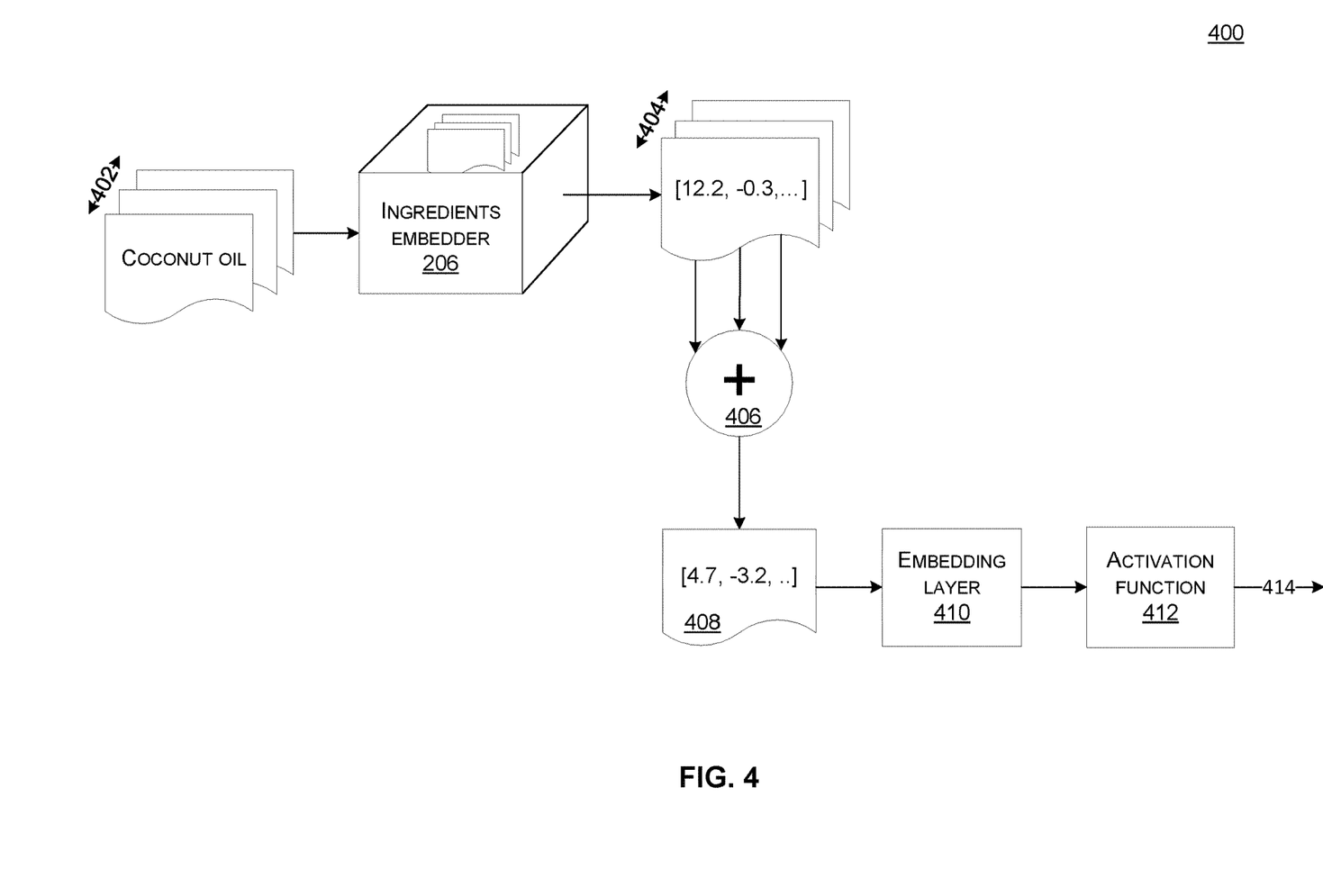
FIG. 4 illustrates an embodiment of a system which can utilize an ingredient embedder to incorporate unsupervised data for training an embedding layer, in certain embodiments.

FIG. 4 illustrates a system 400 which can utilize the ingredient embedder 206 to incorporate unsupervised data (e.g., as a second training dataset, etc.) for training an embedding layer, in certain embodiments.

As shown in FIG. 4, ingredients 402 may include a second set of ingredients belonging to an unsupervised dataset. The ingredients embedder 206 may be used to convert the ingredient strings from the ingredients 402 into multi-dimensional embedding vectors 404 to represent the ingredients in a meaningful space. In some implementations, functionality of the ingredients embedder 206 may be adapted from the word2vec (e.g., skip-gram, continuous bag-of-words (CBOW)) and/or similar model, but any suitable approaches can additionally or alternatively be used. For unsupervised feature learning, a respective embedding vector for each ingredient in the formula may be fetched from the ingredients embedder 206 to provide embedded vectors 404. An adder 406 may be used to generate an embedded formula 408 by performing the weighted sum of the embedded vectors 404 using their proportions in the formula. Since the embeddings can be trained without quantities in specific examples, the multi-warm vector values can be scaled using each ingredient's distribution. In some implementations, this may be performed using a dot product with an embedding matrix. The embedded formula vector 408 may have a different (e.g., much smaller) dimension, may be dense, and/or may contain negative values.

The embedding layer 410 may be implemented using a linear neural network layer and/or another suitable model (e.g., a different type of neural network, any suitable models described herein, etc.). The embedding layer 410 may be trained to incorporate unsupervised data and/or domain knowledge (e.g., a second training set) to supplement the limited amount of supervised data (e.g., a first training set) represented in the raw recipe data 218. The unsupervised data may belong to a large set of recipes obtained from the web, generated automatically or manually, and/or otherwise procured. In specific examples, leveraging the embedding layer 410 (e.g., to incorporate unsupervised data and/or domain knowledge to supplement supervised data and/or other suitable data, etc.) can confer improvements in computer function through facilitating improvements in accuracy of predicting color of a food item and/or recommending changes to achieve a target color for a food item.

The activation function 412 may be used to generate a vector 414 with a probability distribution of the ingredients, which may represent the likelihood of also being in a given recipe. In some implementations, "Softmax" or a similar activation function may be used to output the vector 414. The probability predictions in the vector 414 can add up to one. As an example, the vector 414 may include "milk: 0.03", "butter: 0.76" and "olive oil: 0.21." In specific examples, the probability predictions generated by the system 400 may be useful to utilize generally large amounts of unsupervised data for supplementing the relatively smaller amount of supervised data for predicting the color(s) of the given food item(s).

Referring back to FIG. 2, the images database 220 may include images in the form of pixel values (and/or other suitable form) for each food item associated with the raw recipe data 218. In some implementations, the images database 220 and the raw recipe data 218 may be part of the same dataset. In certain embodiments, instead of relying on observed color information of the ingredients or the food item provided in the raw recipe data 218, color of each food item can be extracted from the corresponding images. For example, in certain instances, a label for the color may be too broad (e.g., brown), multiple colors may be observed for a food item, and/or the label may include a non-color word. Thus, in certain implementations, the image color extractor 208 in FIG. 2 may be configured to extract the color from the image of each food item stored in the images database 220.

The image color extractor 208 may utilize any suitable algorithm to extract the colors from the image(s) of each food item. In some implementations, given an image, the image color extractor 208 may flatten its pixels into a list of RGB values. In some implementations, to determine an RGB value for a food item, the image color extractor 208 may apply k-means clustering to the pixel values of the food item's image to get two clusters and then discard one of the clusters which has the center closest to the background. For example, the image color extractor 208 may cluster the color vectors using K-means with k=2 into food color and background color. In specific examples, the images have a uniform white or black background, therefore, in certain instances; four corners of the image may be used to extract the most dominant color. Note that the RGB color space is discussed for color representation with reference to the image color extractor 208, however, it will be understood that the colors may be represented using any suitable color space without deviating from the scope of the disclosure. Additionally or alternatively, the image color extractor 208 can leverage any suitable approaches in extract colors from the image(s) of each food item.

In certain instances, some of the food items may have multiple separate colors (e.g., a pie's crust and filling, an empanada's outside color and inside color, a cake and its toppings, and/or food items with irregularly spread out ingredients). In such cases and/or in any suitable scenarios, preparation process in addition to the raw ingredients (and/or in addition to any suitable types of data described herein, etc.) may be used to accurately predict the color of the image. For example, in some instances, the preparation process can affect the coloration of homogeneous foods through processes such as baking.

In certain embodiments, the correction process 210 may be used to correct any errors for the color extraction process. The images may be inspected manually and/or by automated means for correction. In instances, where there are multiple images for a food item, the most relevant image may be used. In some instances, raw recipe data for the food items without any images, or with multiple images with highly varying colors may be discarded. Any suitable image processing techniques can be applied for processing the images into a form suitable for use by the image color extractor 208. Image processing techniques (e.g., for use in relation to image color extraction, for use in relation to any suitable components of embodiments of the systems and/or any suitable processes of embodiments of the methods, etc.) can include any one or more of: image filtering, image transformations, histograms, structural analysis, shape analysis, object tracking, motion analysis, feature detection, object detection, stitching, thresholding, image adjustments, mirroring, rotating, smoothing, contrast reduction, and/or any other suitable image processing techniques.

The color encoder 212 may be configured to encode the colors of the food item for representing in a color space. For example, the colors to be encoded may have been extracted using the image color extractor 208 or provided in the raw recipe data 218 for the respective food item. The encoding may be based on RGB space, inverted RGB space, HSV space, CMYK space, CIE L*a*b* (or CIELAB or Lab) and/or another suitable space. In some instances, representation may be more or less accurate based on the regression model (and/or other suitable model) used for learning, lighting of the images, and/or other factors. In certain examples, CIELAB may provide better color representation as it is designed around human perception of color rather than computer display of the image. CIELAB color space is a standard defined by International Commission on Illumination (CIE). It can express color as three values: L* for the lightness from black (0) to white (100), a* from green (−) to red (+), and b* from blue (−) to yellow (+). In some instances, CIELAB color space may provide better results for implementing a loss function (e.g., delta E metric) for the color difference. However, any suitable color space can be used.

The loss function 214 may be configured to improve the prediction of visually perceived color differences through the introduction of various corrections to the color represented in a particular color space. In certain embodiments, the loss function 214 may implement the CIEDE2000 delta E metric to describe the distance between two colors represented in the CIELAB color space. For example, the CIELAB color space may be designed so that its Euclidean distance is delta E. The CIEDE2000 delta E metric may be designed so that its unit distance is the "just noticeable difference" between the two colors. The "just noticeable difference" of the delta E can be usually 1, e.g., if two colors have delta E less than 1 it is unperceivable and larger than 1 it is perceivable. Although, in specific examples, the "just noticeable difference" is an indirect proxy, it can be a most suitable and objective metric for human perception and its constants can be tuned to better measure the desired color attributes. Furthermore, in specific examples, CIEDE2000 can be designed to deconstruct the color into Lightness, Chroma and Hue (LCH), and to compensate for nonlinearities in LCH and colors near blue. CIEDE2000 can also include weighting factors for L,C,H dependent on the application (e.g., cars, textiles, computer graphics, etc.).

The prediction model 216 may be configured to take into account feedback from the loss function 214 and predict the color attributes 106 of the given food item. In certain embodiments, the color attributes 106 may be represented in the CIELAB space, e.g., L*a*b*. The CIELAB space can be represented in a three-dimensional space using a three-dimensional model. The three coordinates of CIELAB may represent the lightness of the color, its position between red/magenta and green, and its position between yellow and blue. Generally, same amount of numerical changes in the L*a*b* values correspond to roughly the same amount of visually perceived change. It will be noted that the color attributes 106 may be represented in any suitable color space (e.g., RGB, inverted RGB, HSV, etc.) without deviating from the scope of the disclosure. The prediction model 216 may further determine that the color of the food item is a particular color from a color palette or color scheme.

The prediction model 216 may utilize a regression model, e.g., a type of neural network and/or ordinary least squares (OLS) and/or other suitable models, based on a number of factors. In examples, the effect of ingredients on color is generally not linear, e.g., cooking can change the color of an ingredient. Furthermore, in non-uniform recipes, certain ingredients can dominate the color. Thus, in specific examples, a forward neural network may perform better than the OLS model in certain embodiments. As an example, a configuration of the neural network may include multiple dense layers with leaky ReLU activation and a final output layer with linear activation with embeddings for the input. Both the input data and the output data may be scaled for mean 0 and variance 1.

In certain embodiments, prediction models 216 and/or other suitable models, suitable components of embodiments, and/or suitable portions of embodiments of methods described herein can include, apply, employ, perform, use, be based on, and/or otherwise be associated with artificial intelligence approaches (e.g., machine learning approaches, etc.) including any one or more of: supervised learning (e.g., using gradient boosting trees, using logistic regression, using back propagation neural networks, using random forests, decision trees, etc.), unsupervised learning (e.g., using an Apriori algorithm, using K-means clustering), semi-supervised learning, a deep learning algorithm (e.g., neural networks, a restricted Boltzmann machine, a deep belief network method, a convolutional neural network method, a recurrent neural network method, stacked autoencoder method, etc.), reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable artificial intelligence approach.

In specific examples, the color predictor 102 may utilize only the ingredients of the food item to predict the color since data from the raw recipe data 218 may be limited. For example, the recipe information can be unstructured, and there can be insufficient data available without structure. Predicting the color of a food item may not be a deterministic problem due to various factors—multiple dishes with different colors can be made from the same ingredients, many food items may have more than one color (e.g., cakes, pies, soups), limited size of the training dataset, and/or other suitable factors. Thus, in such cases and/or in suitable scenarios, predicting a primary color of the food item with the recipe information may provide better results. In certain embodiments, the color predictor 102 may additionally or alternatively be used as a component in a system that may utilize a color recommender to provide a recommendation for changes in the formula for the recipe to improve its color to match the desired color. In certain embodiments, this is further discussed with reference to FIG. 5.

Figure 5:
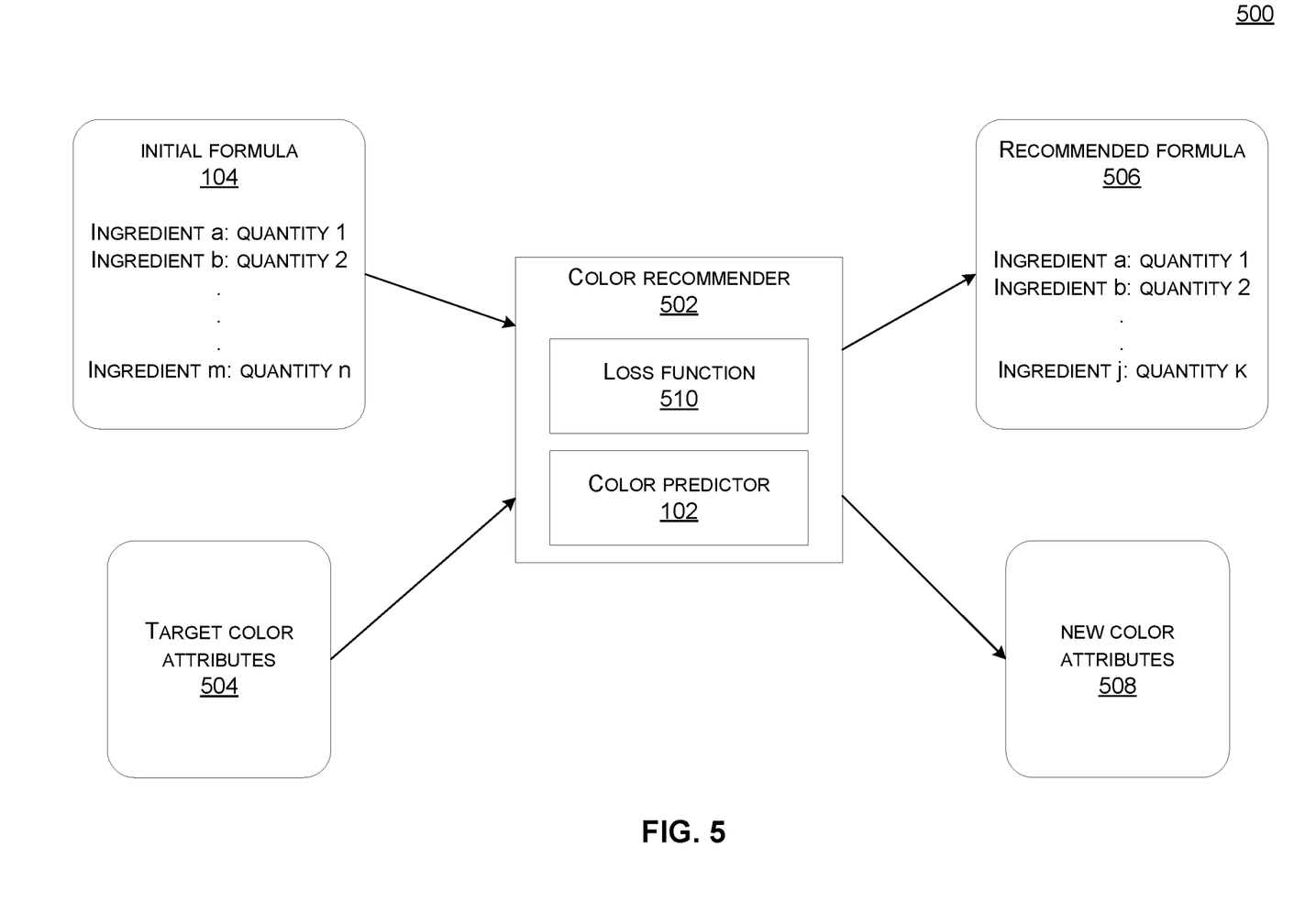
FIG. 5 illustrates an embodiment of a system comprising a color recommender configured to provide a recommendation for changes in the given formula for a food item to achieve the desired color of the food item.

FIG. 5 illustrates an embodiment of a system 500 comprising a color recommender 502 for providing (e.g., configured to provide, etc.) one or more recommendations for changes in one or more initial formulas 104 to achieve the desired color of the food item given target color attributes 504.

In certain embodiments, the color recommender 502 may be based on stochastic gradient descent (SGD) and back propagation models. The color recommender 502 may utilize the color predictor 102 to predict the color of a food item given the initial formula 104. For example, the color recommender 502 can determine one or more recommendations for one or more changes (e.g., modifications, etc.) to one or more initial formulas 104, based on output(s) of the color predictor 102. The color recommender 502 may additionally or alternatively implement a loss function 510 to optimize the initial formula 104 to achieve the desired color. The color recommender 502 may provide (e.g., output, determine, etc.) a recommended formula 506 and/or new color attributes 508 corresponding to the modification in the initial formula 104 to achieve the target color attributes 504. The target color attributes 504 and the new color attributes 508 may belong to the same color space as the color attributes 106 of FIG. 1, e.g., CIELAB, RGB, or another color space. Alternatively, the target color attributes 504, the new color attributes 508, and the color attributes 106 can belong to different color spaces, and/or any suitable combination of attributes can belong to any suitable combination of color spaces. As an example, the initial formula 104 may include 47.2% water, 20.6% pea protein, and 15.7% coconut oil; the target color attributes 504 may include {R: 102, G: 23, B: 214}.

The loss function 510 may take into consideration multiple factors while determining the changes in the initial formula 104, e.g., attribute distance (e.g., how close is the initial formula 104 to the target color attributes 504), ingredient distance (e.g., how close is the recommended formula 506 to the initial formula 104 since it is desired to produce the same or similar type of food item for which the initial formula 104 was provided, and in specific examples to have minimal changes to the initial formula 104, thus making the cooking process similar and/or easier such as for the chefs, etc.), ingredient likelihood (e.g., how sensible the new formula is, for example, using 80% salt in the recipe may not be typical), and/or ingredient sparsity (e.g., how many ingredients are in the recommended formula 506, for example, it is not typical to have just a pinch of 300 ingredients). In certain embodiments, the loss function 510 is further explained with reference to FIG. 6.

Figure 6:
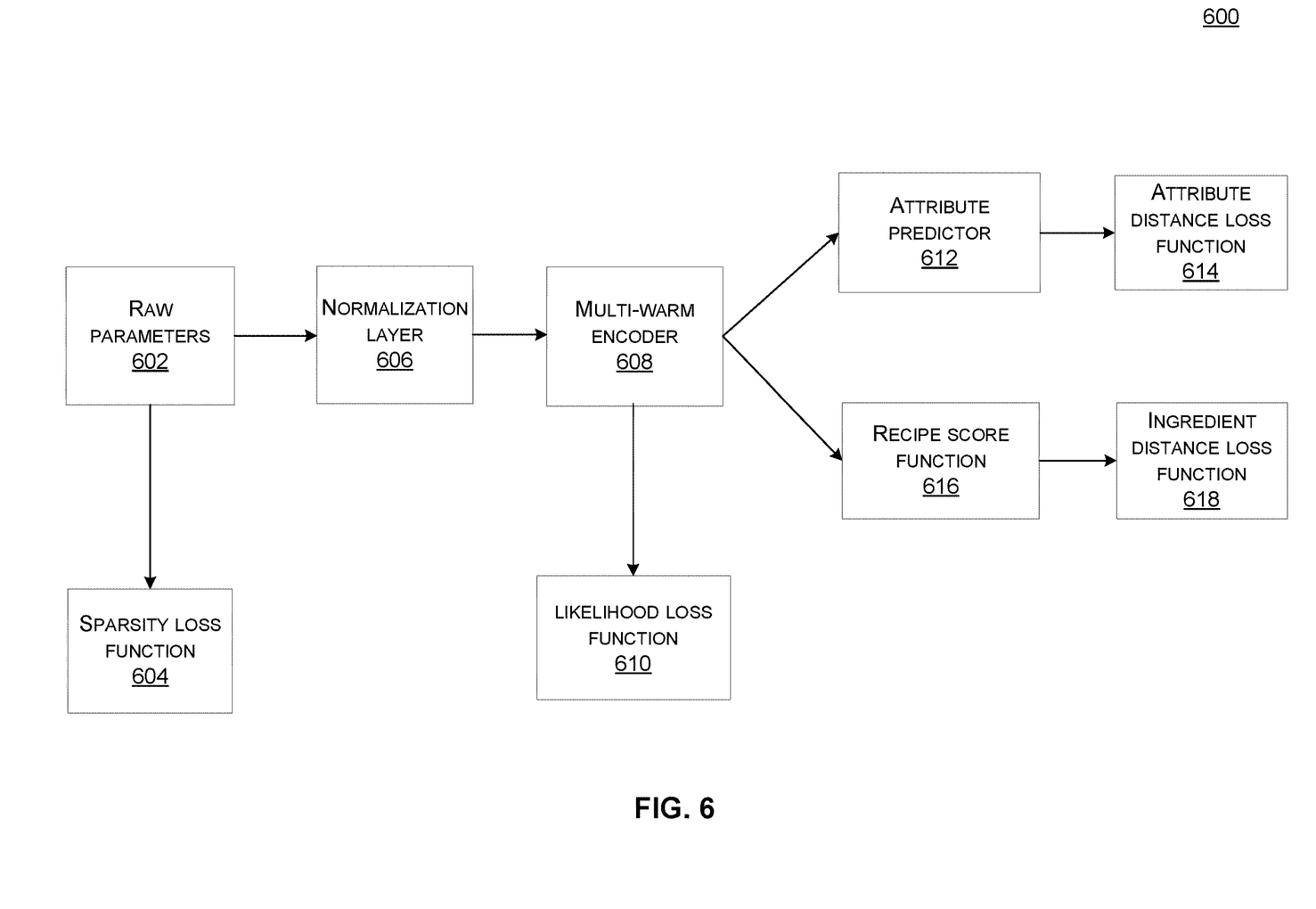
FIG. 6 illustrates a block diagram that can be used to describe the loss function model implemented by the color recommender, according to certain embodiments.

FIG. 6 illustrates a block diagram 600 that can be used to describe the loss function model implemented by the color recommender 502 in certain embodiments. The color recommender 502 may be designed to optimize inputs to the color predictor 102 using the loss function model described in FIG. 6.

The color recommender 502 may operate on raw parameters 602 for a given formula of a recipe to implement the loss functions. As an example, the raw parameters 602 may include ingredients in the initial formula 104, e.g., ingredient a, ingredient b, . . . , ingredient m. In some embodiments, the raw parameters 602 may be optimized using a sparsity loss function 604. The raw parameters 602 may be further normalized using a normalization layer 606, such as before being operated by other loss functions, e.g., likelihood loss function 610, attribute distance loss function 614, and/or ingredient distance loss function 618, etc., but the normalization layer 606 can be used at any suitable time.

The sparsity loss function 604 may be implemented to bring the ingredients in the raw parameters 602 to zero unless they significantly improve the attribute loss. The attribute gradient may be balanced with the sparsity gradient. The slope near zero may be used to determine whether or not to sparse. The sparsity loss function 604 may also implement a step sparsity loss function, a magnitude sparsity loss function, an Li norm, among others to minimize the color difference. However, the sparsity loss function 604 can implement any suitable combination of loss functions.

The normalization layer 606 may be used to normalize the raw parameters 602 for other loss metrics and to avoid interfering with the sparsity loss function 604. In specific examples, after each training step, raw parameters may be projected according to non-negativity and multi-warm constraints, and constrained optimization may be performed.

The normalized ingredients may be encoded to generate a multi-warm vector using a multi-warm encoder 608. The multi-warm encoder 608 may be similar to the multi-warm encoder 204 and the multi-warm vector may be similar to the multi-warm vector 300 shown in FIG. 3. The color recommender 502 may be designed to optimize the ingredients in the multi-warm vector, which can feed to the color predictor 102.

Likelihood loss function 610 may be used to determine whether a given formula is a real or a typical formula. Likelihood may be defined as the probability of the given formula under the distribution of formulas, which may be proportional to the product of probability density function (PDF) values for all the ingredients. Likelihood loss function 610 may be operationalized as log-likelihood for numerical stability. Gradient for ingredients, which are not in the recipe, can be zeroed out below their minimum. The PDF can be infinitesimal but actual likelihood may not be.

Likelihood for the original ingredient can be subtracted off for easier interpretation without any effect on the gradient, as shown in Equation (1) below.

$$\text{likelihood}(x) - \text{likelihood}(x_{orig}),\quad \text{Equation (1)}$$

$$\text{wherein, likelihood}(x) = \begin{cases} f_X(x_i) & x_i \geq \text{minval}_i \\ 0 & x_i < \text{minval}_i \end{cases}\quad \text{Equation (2)}$$

Optimizing the likelihood may not always be preferable since it can push towards an irrelevant mode. In certain instances, the likelihood can be clipped above a threshold while avoiding any modification of the good recipes. In specific examples, the quantities are less likely than the original recipe. In examples, further improvements are possible by using quantile threshold for all ingredients, only modifying unlikely quantities similar to the original, or implementing inverse cumulative distribution function (CDF) instead of log-likelihood, among others.

Ingredient distance loss function 618 may be implemented to determine how close the recommended formula 506 is to the initial formula 104. In some examples, it may only include gradient for ingredients that were in the original recipe. In examples, since new ingredients may change the percentages of original ingredients, just the selected ingredients may be normalized. In examples, this may result in those ingredients to be a smaller part of the overall recipe; however, it may be mitigated by the likelihood component.

In examples, since the ingredient data is not normally distributed and is not linear (e.g., difference between 0.001 and 0.002 is much larger than between 0.501 and 0.502), logit-normal distribution may be used to calculate ingredient distance in the logit space. In examples, the logit (inverse sigmoid) function is generally linear near 0.5, can stretch small values, and is bounded in [0, 1]. An example logit function is shown in Equation (3), where p is probability:

$$logit(p) = \log\left(\frac{p}{1-p}\right).\quad \text{Equation (3)}$$

Logit-normal distribution generally assumes that the logit of the data is normally distributed. The parameters can be p and a of the logits, as shown in Equation (4). It may generally be used for modeling variables which are proportions bounded in [0, 1], where 0 and 1 may never occur.

$$f_X(x; \mu, \sigma) = \frac{1}{\sigma}$$

In certain embodiments, recipe score function 616 may be used to determine Li distance in nutritional/chemical/physical space. The recipe score function may be based on a difference between the initial formula 104 and the recommended formula 504. The score can be determined in any suitable manner within the scope of the disclosure.

Attribute predictor 612 may be used to determine new color attributes 508 corresponding to the recommended formula 506. In some implementations, the attribute predictor 612 may utilize the color predictor 102 or functionality of the color predictor 102 to determine the new color attributes 508 based on the attribute distance (e.g., how close is the initial formula 104 to the target color attributes 504). For example, the new color attributes 508 may be similar to the color attributes 106. The new color attributes 508 may belong to the same or different color space than the target color attributes. As an example, the recommended formula 506 may include 24.5% water, 30.7% pea protein, and 10.2% almond oil, and the new color attributes 508 may include {R: 112, G: 15, B: 210}. The new color attributes 508 may correspond to the recommended formula 506, which may provide optimal modification to the initial formula 104.

Attribute distance loss function 614 may be used to determine how close the formula is to the target color attributes 504 based on the attribute predictions made by the attribute predictor 612. In some examples, mean squared error (MSE) in the LAB space can be taken into account. This may be extensible to other attributes (e.g., smell, taste) so long as there is a differentiable model to predict them given a recipe.

Figure 7:
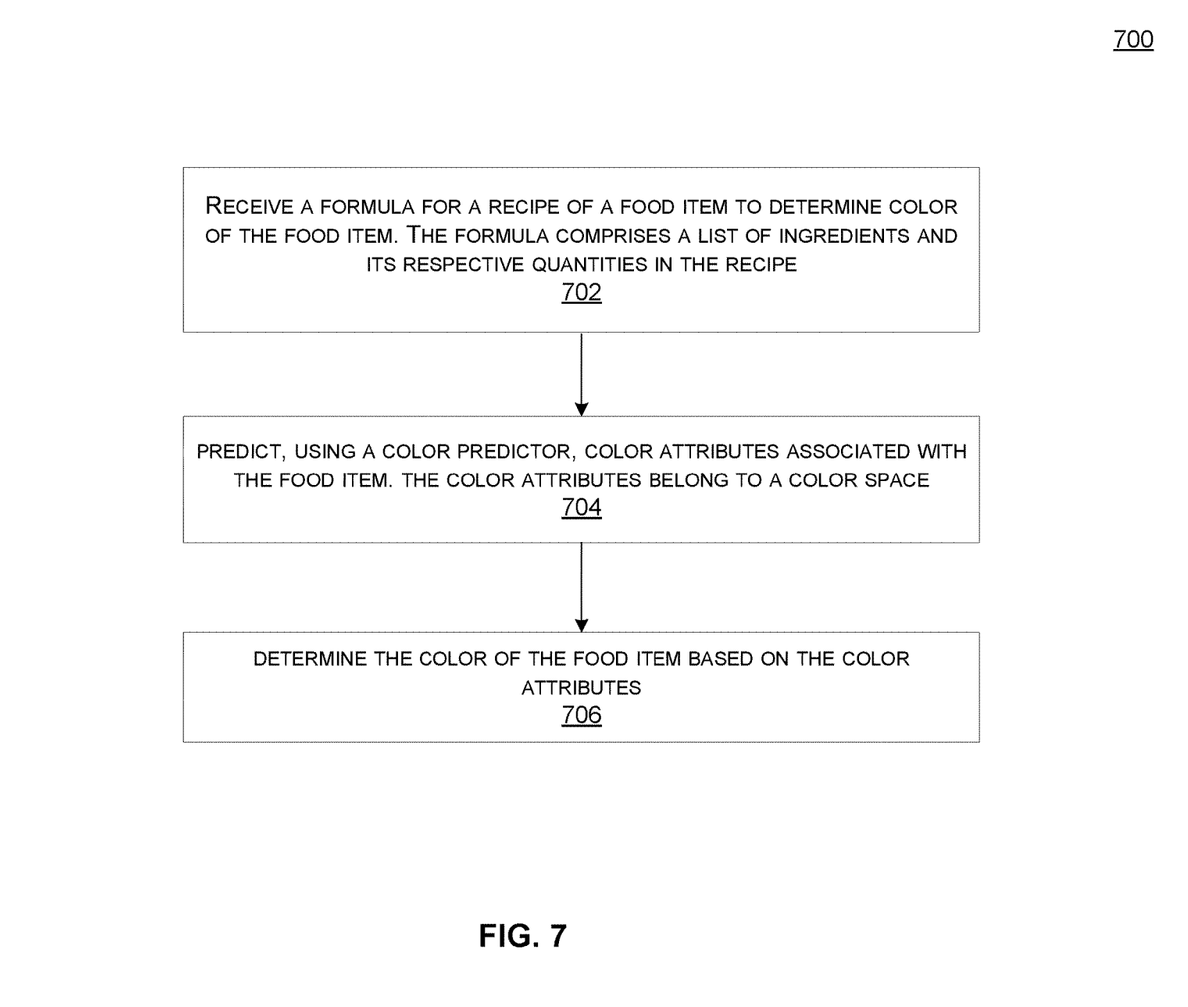
FIG. 7 illustrates a computer-implemented method to determine color of a food item according to certain embodiments.

FIG. 7 illustrates an embodiments of a computer-implemented method 700 to determine color of a food item according to certain embodiments. The method 700 may be executed by the color predictor 102 in FIG. 1 or in FIG. 5, and/or by any suitable combination of components described herein.

In step 702, a formula for a recipe of the food item may be received. The formula may comprise a list of ingredients and its respective quantities in the recipe. The food item may include plant-based ingredients, animal-based ingredients, synthetic ingredients, and/or other suitable types of ingredients. As discussed with reference to FIG. 2, the formula may be the initial formula 104 received by the color predictor 102. The formula may comprise ingredients a-m and its respective quantities 1-$n$. For example, the ingredient a may be water and the quantity 1 may be 47.2%, the ingredient b may be pea protein and the quantity 2 may be 20.6%, and so on. In some examples, the formula may be part of the raw recipe data 218 in FIG. 2.

In step 704, the list of ingredients may be encoded to represent as an embedding vector in a color space. As discussed with reference to FIG. 2, the list of ingredients may be encoded by the multi-warm encoder 204 or another suitable encoder. In some embodiments, the list of ingredients may be parsed by the ingredient parser 202 before feeding to the multi-warm encoder 204.

In step 704, color attributes associated with the food item can be predicted using a color predictor. The color attributes may belong to a color space. In some implementations, the color predictor 102 may be used to predict the color attributes 106 associated with the food item as discussed with reference to FIG. 2. As an example, the color attributes 106 may belong to the CIELAB color space and may include floating point values.

The color predictor may have been trained using supervised dataset and/or an unsupervised dataset. In one example, the raw recipe data 218 and the images extracted from the images database 220 may have been used to train the prediction model 216 in the color predictor 102. For example, the method 700 may also include encoding the list of ingredients to generate a multi-warm vector. The list of ingredients can be encoded by the multi-warm encoder 204 to generate a multi-warm vector comprising a respective dimension for each ingredient in the list of ingredients. In some examples, the list of ingredients may be parsed by the ingredient parser 202 before feeding to the multi-warm encoder 204.

The method 700 may further include generating the ingredient embedding vector 404 using the ingredient embedder 206 given the multi-warm vector 300. The method 700 may further include extracting color information associated with the food item for representing in the color space. For example, the color information may be extracted using the image color extractor 208 and the corresponding colors may be encoded using the color encoder 212 for representing in the color space. The method 700 may further include training the color predictor given the ingredient embedding vector and the color information. As an example, the color predictor 102 may utilize CIEDE2000 delta E metric as a loss function for improving the prediction of the color.

In step 706, the color of the food item can be determined based on the color attributes. For example, the prediction model 216 may determine the color of the food item based on the color space the color attributes 106 may belong to. For example, the prediction model 216 may determine that the color of the food item is a particular color from a color palette or color scheme.

Figure 8:
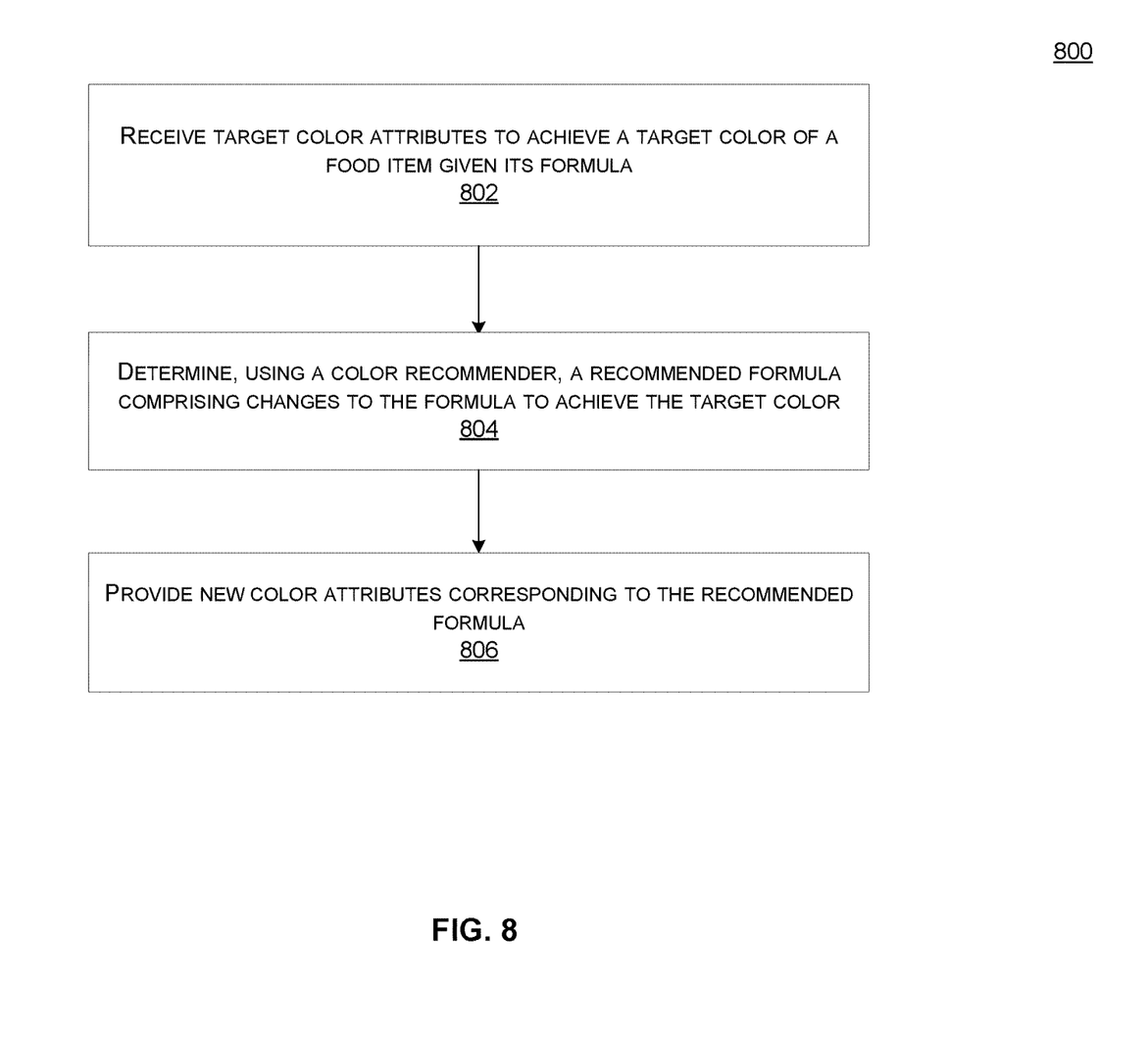
FIG. 8 illustrates a computer-implemented method to provide recommendation to achieve target color attributes for a food item according to certain embodiments.

FIG. 8 illustrates an embodiments of a computer-implemented method 800 to provide recommendation to achieve target color attributes for a food item according to certain embodiments. The method 800 may be executed by the color recommender 504 in FIG. 5.

In step 802, target color attributes are received to achieve a target color of a food item given its formula. The target color may correspond to the target color attributes. For example, the target color attributes 502 may be received by the color recommender 502. In some examples, the target color attributes 502 may be part of the raw parameters 602 in FIG. 6. The target color attributes may belong to a color space, e.g., CIELAB, RGB, inverted RGB, etc.

In step 804, using a color recommender, changes to the formula can be determined to achieve the target color. The color recommender 502 may determine the recommended formula 506 as discussed with reference to FIG. 5 and FIG. 6. In certain embodiments, the changes in the formula may have been determined based on the SGD and back propagation models as well as one or more loss functions. For example, the loss functions may include the sparsity loss function 604, the likelihood loss function 610, the attribute distance loss function 614, and the ingredient distance loss function 618 to take the ingredient sparsity, ingredient likelihood, attribute distance, and the ingredient distance respectively into consideration.

In step 806, new color attributes corresponding to the recommended formula are provided. The color recommender 502 may provide the new color attributes 508 corresponding to the recommended formula 506 using the attribute predictor 612. The attribute predictor 612 may be similar to the color predictor 102 or include the functionality of the color predictor 102, and consider the attribute distance loss function 614 in determining the new color attributes 508.

As discussed with reference to FIGS. 1-8, the disclosed embodiments can utilize various machine learning algorithms and/or other suitable models to help minimize cooking time and resources by identifying even before a food item is cooked or prepared whether a recipe for the food item needs to be altered or does not need to be cooked at all, based on the color prediction. Additionally, the color recommender can use the color predictor to provide a recommendation for changes in the formula for the recipe to improve the color of the food item or to achieve a target color.

Certain embodiments can confer improvements in computer-related technology (e.g., artificial intelligence, machine learning, neural networks, etc.) by facilitating computer performance of functions not previously performable and/or not practically performed by the human mind. For example, the technology can leverage one or more computational machine learning-associated training sets for training one or more artificial intelligence models (e.g., color predictor models; color recommender models; etc.) in a non-generic, application-specific fashion for predicting color of a food item and/or recommending changes to achieve a target color of a food item.

Certain embodiments can confer improvements in functioning of computing systems themselves through components (e.g., components of embodiments of systems described herein, etc.) and/or processes (e.g., processes of embodiments of methods described herein, etc.) for improving computational accuracy in computationally predicting color of a food item and/or computationally recommending changes to achieve a target color of a food item.

Embodiments of the systems and/or methods can include components for and/or processes including generating one or more food items including one or more colors (e.g., food items with the one or more colors) determined based on recommendations from one or more color recommender models and/or color prediction outputs from one or more predictor models. In a specific example, the method can include determining a set of recommended changes (e.g., to a food item formula) to achieve one or more colors for a food item; and generating the food items including the one or more colors (and/or including similar colors or derivable colors) based on the set of recommended changes (e.g., implementing one or more portions of the recommended changes; implementing modifications derived based on the recommended changes; etc.).

Embodiments of the methods can include any suitable processes and/or functionality described in relation to the figures, system, and/or described herein.

Models described herein can be run or updated: once; at a predetermined frequency; every time a certain process is performed; every time a trigger condition is satisfied and/or at any other suitable time and frequency. Models can be run or updated concurrently with one or more other models, serially, at varying frequencies, and/or at any other suitable time. Each model can be validated, verified, reinforced, calibrated, or otherwise updated based on newly received, up-to-date data; historical data or be updated based on any other suitable data.

Portions of embodiments of methods and/or systems described herein are preferably performed by a first party but can additionally or alternatively be performed by one or more third parties, users, and/or any suitable entities Additionally or alternatively, data described herein can be associated with any suitable temporal indicators (e.g., seconds, minutes, hours, days, weeks, time periods, time points, timestamps, etc.) including one or more: temporal indicators indicating when the data was collected, determined (e.g., output by a model described herein), transmitted, received, and/or otherwise processed; temporal indicators providing context to content described by the data; changes in temporal indicators (e.g., data over time; change in data; data patterns; data trends; data extrapolation and/or other prediction; etc.); and/or any other suitable indicators related to time.

Additionally or alternatively, parameters, metrics, inputs (e.g., formulas, ingredient attributes, other suitable features, etc.), outputs (e.g., color attributes, recommended formulas, etc.), and/or other suitable data can be associated with value types including any one or more of: scores, text values (e.g., ingredient descriptors, etc.), numerical values (e.g., color attributes, etc.), binary values, classifications, confidence levels, identifiers, values along a spectrum, and/or any other suitable types of values. Any suitable types of data described herein can be used as inputs (e.g., for different models described herein; for components of a system; etc.), generated as outputs (e.g., of models; of components of a system; etc.), and/or manipulated in any suitable manner for any suitable components.

Additionally or alternatively, suitable portions of embodiments of methods and/or systems described herein can include, apply, employ, perform, use, be based on, and/or otherwise be associated with one or more processing operations including any one or more of: extracting features, performing pattern recognition on data, fusing data from multiple sources, combination of values (e.g., averaging values, etc.), compression, conversion (e.g., digital-to-analog conversion, analog-to-digital conversion), performing statistical estimation on data (e.g. ordinary least squares regression, non-negative least squares regression, principal components analysis, ridge regression, etc.), normalization, updating, ranking, weighting, validating, filtering (e.g., for baseline correction, data cropping, etc.), noise reduction, smoothing, filling (e.g., gap filling), aligning, model fitting, binning, windowing, clipping, transformations, mathematical operations (e.g., derivatives, moving averages, summing, subtracting, multiplying, dividing, etc.), data association, interpolating, extrapolating, clustering, image processing techniques, other signal processing operations, other image processing operations, visualizing, and/or any other suitable processing operations.

Embodiments of the system and/or portions of embodiments of the system can entirely or partially be executed by, hosted on, communicate with, and/or otherwise include one or more: remote computing systems (e.g., one or more servers, at least one networked computing system, stateless, stateful; etc.), local computing systems, mobile phone devices, other mobile devices, personal computing devices, tablets, databases, application programming interfaces (APIs) (e.g., for accessing data described herein, etc.) and/or any suitable components. Communication by and/or between any components of the system 100 and/or other suitable components can include wireless communication (e.g., WiFi, Bluetooth, radiofrequency, Zigbee, Z-wave, etc.), wired communication, and/or any other suitable types of communication.

Components of embodiments of the system can be physically and/or logically integrated in any manner (e.g., with any suitable distributions of functionality across the components, such as in relation to portions of embodiments of methods described.

Embodiments of the methods 700, 800 and/or the system 500 can include every combination and permutation of the various system components and the various method processes, including any variants (e.g., embodiments, variations, examples, specific examples, figures, etc.), where portions of the methods 700, 800 and/or processes described herein can be performed asynchronously (e.g., sequentially), concurrently (e.g., in parallel), or in any other suitable order by and/or using one or more instances, elements, components of, and/or other aspects of the system 100 and/or other entities described herein.

Any of the variants described herein (e.g., embodiments, variations, examples, specific examples, figures, etc.) and/or any portion of the variants described herein can be additionally or alternatively combined, aggregated, excluded, used, performed serially, performed in parallel, and/or otherwise applied.

The system 500 and/or methods 700, 800 and/or variants thereof can be embodied and/or implemented at least in part as a machine configured to receive a computer-readable medium storing computer-readable instructions. The instructions can be executed by computer-executable components that can be integrated with the system. The computer-readable medium can be stored on any suitable computer-readable media such as RAMs, ROMs, flash memory, EEPROMs, optical devices (CD or DVD), hard drives, floppy drives, or any suitable device. The computer-executable component can be a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the system 500, methods 700, 800, and/or variants without departing from the scope defined in the following claims.

What is claimed is:

1. A computer-implemented method to determine color of a food item, the method comprising:
    generating, by a first model, multi-dimensional embedding vectors from a plurality of ingredients;
    receiving an initial formula of an item, the initial formula comprising a first set of ingredients and its respective quantities;
    representing the initial formula as a sparse proportional vector comprising a respective dimension for each of the first set of ingredients;
    generating an ingredient embedding vector from the sparse proportional vector by using the multi-dimensional embedding vectors;
    extracting a color from an image of the item;
    encoding the color for representing in a color space;
    configuring a second model given the ingredient embedding vector and the color, wherein the configuring includes implementing corrections to the second model for the color represented in the color space;

predicting a particular color of a given formula based on the corrections and the multi-dimensional embedding vectors;
applying a third model to the particular color of the given formula to determine a recommended formula, the recommended formula including changes to the given formula to achieve a target color, wherein the third model implements at least one loss function to determine the changes to the given formula, wherein the at least one loss function considers a plurality of factors including:
an attribute distance between the given formula and the target color,
an ingredient distance between the given formula and recommended formula,
an ingredient likelihood of the recommended formula to be a realistic formula, and
an ingredient sparsity of ingredients in the recommended formula.

2. The method of claim 1, wherein the prediction is based on a regression model.

3. The method of claim 1, wherein the first set of ingredients belongs to a supervised dataset.

4. The method of claim 1, wherein the plurality of ingredients belongs to an unsupervised dataset.

5. The method of claim 1, further comprising using a loss function configured to implement the corrections to the second model.

6. The method of claim 1, further comprising providing new color attributes corresponding to the recommended formula.

7. The method of claim 6, wherein the new color attributes corresponding to the recommended formula belong to a CIELAB color space.

8. The method of claim 1, wherein the at least one loss function includes a sparsity loss function, a likelihood loss function, an attribute distance loss function, and an ingredient distance loss function.

9. The method of claim 1, wherein raw ingredients of the given formula are normalized prior to be being operated on by at least one of the at least one loss function.

10. A computer-implemented method to determine color of a food item, the method comprising:
generating, by a first model, multi-dimensional embedding vectors from a plurality of ingredients;
receiving a formula for a recipe of an item, the formula comprising a list of ingredients and its respective quantities in the recipe;
encoding the list of ingredients to generate a multi-warm vector, wherein the multi-warm vector comprises a respective dimension for each ingredient in the list of ingredients;
generating an ingredient embedding vector from the multi-warm vector by using the multi-dimensional embedding vectors;
extracting color associated with the item;
encoding the color for representing in a color space;
configuring a second model given the ingredient embedding vector and the color, wherein the configuring includes implementing corrections to the second model for the color represented in the color space;
predicting color attributes associated with a particular food item based on the corrections and the multi-dimensional embedding vectors, the color attributes belonging to the color space;
determining a particular color of the particular food item based on the color attributes,
applying a third model to the particular color of the particular food item to determine a recommended formula, the recommended formula including changes to a particular formula of the particular food item to achieve a target color, wherein the third model implements at least one loss function to determine the changes to the particular formula, wherein the at least one loss function considers a plurality of factors including:
an attribute distance between the particular formula and the target color,
an ingredient distance between the particular formula and recommended formula,
an ingredient likelihood of the recommended formula to be a realistic formula, and
an ingredient sparsity of ingredients in the recommended formula.

11. The method of claim 10, wherein the second model is based on a neural network model.

12. The method of claim 10, wherein the color space is based on CIELAB and the second model utilizes CIEDE2000 delta E metric as a loss function for prediction of the color.

13. The method of claim 10, wherein the multi-warm vector includes a respective floating-point value for each ingredient in the list of ingredients.

14. The method of claim 10, wherein the recipe is part of a supervised dataset or an unsupervised dataset.

15. The method of claim 10, wherein the ingredient embedding vector is generated using an ingredient embedder, wherein the ingredient embedder is based on a "word2vec" model.

16. The method of claim 10, further comprising:
receiving target color attributes to achieve a target color corresponding to the target color attributes.

17. The method of claim 10, wherein the third model determines the recommended formula based on stochastic gradient descent (SGD) and back propagation models.

18. A computer-implemented method comprising:
generating, by a first model, multi-dimensional embedding vectors from a plurality of ingredients;
receiving an initial formula for a recipe of an initial food item, the initial formula comprising a list of ingredients and its respective quantities in the recipe;
encoding the list of ingredients to generate a multi-warm vector, wherein the multi-warm vector comprises a respective dimension for each ingredient in the list of ingredients;
generating an ingredient embedding vector from the multi-warm vector by using the multi-dimensional embedding vectors;
extracting color associated with the initial food item;
encoding the color for representing in a color space;
configuring a second model given the ingredient embedding vector and the color, wherein the configuring includes implementing corrections to the second model for the color represented in the color space;
predicting color attributes associated with a particular food item based on the corrections and the multi-dimensional embedding vectors, the color attributes belonging to the color space;
determining a particular color of the particular food item based on the predicted color attributes;
receiving target color attributes to achieve a target color of the particular food item;
determining, by a third model, a recommended formula for the particular food item to achieve the target color, the recommended formula including changes to a particular formula of the particular food item to achieve a target color, wherein the third model implements at least one loss function to determine the changes to the particular formula, wherein the at least one loss function considers a plurality of factors including:
an attribute distance between the particular formula and the target color,
an ingredient distance between the particular formula and recommended formula,
an ingredient likelihood of the recommended formula to be a realistic formula, and
an ingredient sparsity of ingredients in the recommended formula; and
providing new color attributes corresponding to the recommended formula.

19. The method of claim 18, further comprising utilizing CIEDE2000 delta E metric as a loss function to predict the color attributes.

20. The method of claim 18, wherein the color attributes associated with the particular food item are predicted and the recommended formula is determined based on neural network model.

\* \* \* \* \*